United States Patent [19]

Koumura

[11] Patent Number: 4,520,400
[45] Date of Patent: May 28, 1985

[54] IMAGE RECORDING DEVICE

[75] Inventor: Noboru Koumura, Narashino, Japan

[73] Assignee: Canon Kabushiki Kaisha, Tokyo, Japan

[21] Appl. No.: 368,726

[22] Filed: Apr. 15, 1982

[30] Foreign Application Priority Data

Apr. 17, 1981 [JP] Japan .................................. 56-58172
Dec. 22, 1981 [JP] Japan .................................. 56-206144
Dec. 22, 1981 [JP] Japan .................................. 56-206145

[51] Int. Cl.³ .............................................. H04N 1/22
[52] U.S. Cl. ................................... 358/296; 358/256; 358/287; 358/293
[58] Field of Search .............. 358/256, 296, 287, 293; 355/3 SH, 14 SH

[56] References Cited

U.S. PATENT DOCUMENTS 4,249,811 2/1981 Douglas ............................... 354/86
4,277,805 7/1981 Sato ..................................... 358/256

Primary Examiner—Michael A. Masinick
Assistant Examiner—Edward L. Coles
Attorney, Agent, or Firm—Fitzpatrick, Cella, Harper & Scinto

[57] ABSTRACT

The invention provides an image recording device having at least one cassette for housing a plurality of sheets of a recording medium, at least one recording head for recording an image on the recording medium housed in the cassette, and right and left exhaust rollers for delivering the recording medium with the image recorded thereon to right and left exhaust trays, respectively. By reciprocal movement, the recording head records an image on the recording medium which is held stationary. Further, the recording head allows recording in an equal size and with a change in magnification.

20 Claims, 15 Drawing Figures

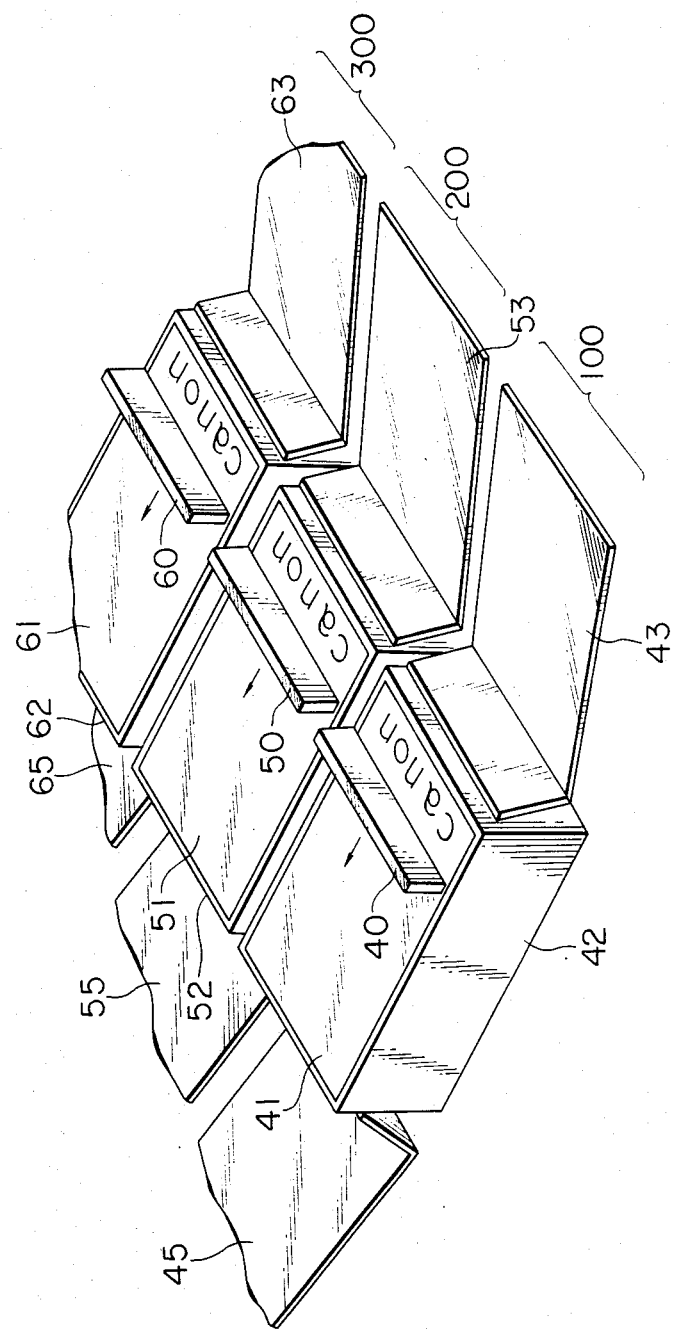

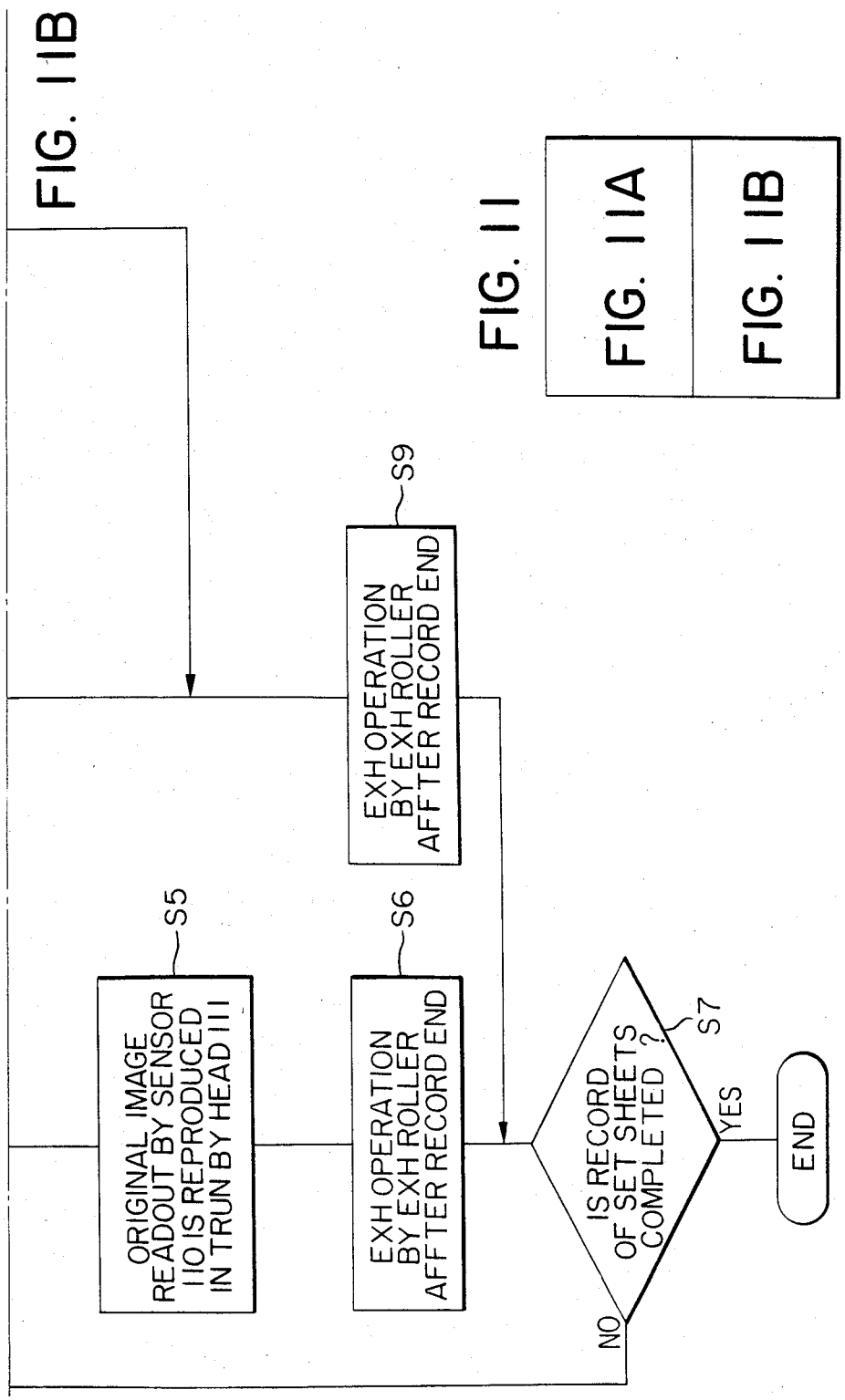

IMAGE RECORDING DEVICE

BACKGROUND OF THE INVENTION

1. Field of the Invention

The present invention relates to an image recording device such as an inkjet recording device or a thermal recording device for recording an image on a recording paper sheet.

2. Description of the Prior Art

In conventional image recording devices, a recording medium such as a paper sheet is disposed on the outer surface of a drum in opposition to a recording head, and the image is recorded. Alternatively, a recording medium is conveyed by rollers, belts and the like to a predetermined recording position, and the image is recorded.

The recording medium is attached to the drum by a fan or a gripper. If the recording medium is drawn by the fan, there is much noise. Further, a number of suction openings must be formed in the drum, resulting in high cost. If a thick or hard recording medium is used, the end of the recording medium may float above the drum, resulting in unclear recording.

If a gripper is used, a mechanically complex structure is needed, also resulting in high cost.

On the other hand, when a conveying mechanism consisting of rollers and belts is used, the recording medium tends to be jammed in the convey path. Further, the jammed recording medium can not be easily removed.

The path from the copying paper sheet cassette which houses a plurality of sheets of recording medium to a recording position is relatively long. Therefore, conveying of the recording medium from the cassette to the recording position is time-consuming.

The image recording device of this type cannot be made compact due to the large diameter of the drum and the long conveying path.

SUMMARY OF THE INVENTION

The present invention has been made to solve the above problems and has for its object to provide an image recording device with a compact and simple construction.

It is another object of the present invention to provide an image recording device for recording an image on a recording medium which is stored in a housing.

It is still another object of the present invention to provide an image recording device for recording an image in an equal size, i.e., at full size, or with a change in magnification on a recording medium stored in the housing.

It is still another object of the present invention to provide an image recording device with a plurality of recording units so that the recording time of a plurality of sheets of recording medium may be shortened greatly.

The other objects, features and advantages of the present invention will be apparent from the following description when taken in conjunction with the accompanying drawings.

BRIEF DESCRIPTION OF THE DRAWINGS

FIG. 8 is a perspective view of an image recording device according to a fourth embodiment of the present invention;

FIGS. 11A and 11B are flow charts of the control operation of the device shown in FIG. 9.

DETAILED DESCRIPTION OF THE PREFERRED EMBODIMENTS

Image recording devices according to the preferred embodiments of the present invention will be described with reference to the accompanying drawings.

Figures 1, 2:
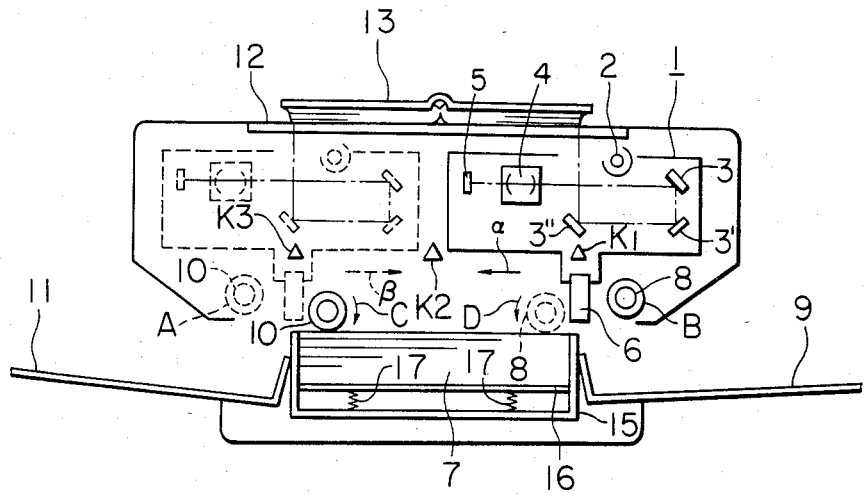
FIG. 1 is a sectional view of an image recording device according to a first embodiment of the present invention.
FIG. 2 is a detailed perspective view of a drive unit of the device shown in FIG. 1.

FIG. 1 is a sectional view of an image recording device according to a first embodiment of the present invention. The image recording device includes a light source 2 for radiating light on an original 13, mirrors 3, 3' and 3", a focusing lens 4, a line image sensor 5 such as a CCD, a recording head 6 comprising a full-line inkjet head described in U.S. Ser. No. 133,327 filed by Canon, a cassette 15 which houses recording paper sheets or films 7, a right exhaust roller 8, a right exhaust tray 9, a left exhaust roller 10, a left exhaust tray 11, and an original table 12 on which an original 13 is placed. The light source 2, the mirror lenses 3, 3' and 3", the lens 4, the image sensor 5 and the recording head 6 constitute an input/output unit 1.

With the device of the above arrangement, the original 13 is placed at a predetermined position on the original table 12 and a print switch (not shown) on the device is depressed. The light source 2 is then lit and the input/output unit 1 is moved at a predetermined speed in the direction indicated by arrow α. Light from the light source 2 is radiated on the original 13 on the original table 12. The light reflected by the original 13 is focused on the line image sensor 5 through an optical path defined by the mirrors 3", 3' and 3, and the lens 4 as indicated by the alternate long-and-one-short dashed line.

Image data of the original 13 is thus supplied as light intensity data to the line image sensor 5. The line image sensor then generates an electrical signal in correspondence with the intensity of the received light. This output signal is subjected to electrically processing such as A/D conversion and supplied as an image recording signal to the recording head 6.

The recording head 6 records an image corresponding to the original image on the recording paper sheet 7 in accordance with the recording signal.

Image data is input and simultaneously output as described above. When the input/output unit 1 is moved in the direction indicated by arrow α to a position 1' indicated by the broken line, one recording sequence is completed. The right exhaust roller 8 is moved to a position indicated by the broken line and simultaneously rotated in the direction indicated by arrow D. Therefore, the recording paper sheet 7 on which an image is recorded is exhausted onto the right exhaust tray 9. Further, since the peripheral speed of the right exhaust roller 8 is faster than the movement of the input/output unit 1, the input/output unit 1 can be moved in the direction indicated by the broken-line arrow β for reading of the original and recording of the next recording paper sheet 7 before the current recording paper sheet 7 is completely exhausted. Therefore, in order to record the image of the same original on a plurality of recording paper sheets 7, waiting time can be shortened greatly. In the same manner as described above, while the image data of the original 13 is read out and the image is recorded on a recording paper sheet 7, the input/output unit 1 is moved in the direction indicated by the arrow β. When the input/output unit 1 reaches a position indicated by the solid line, the recording paper sheet 7 on which the image is recorded is exhausted onto the left exhaust tray 11 through the left exhaust roller 10 which is rotated in the direction indicated by arrow C.

The right and left exhaust rollers 8 and 10 are moved in positions A and B before the input/output unit 1 comes near the rollers 8 and 10. The recording papers 7 are housed in the cassette 15 which has a partition plate 16 and elastic members 17 between the bottom of the cassette 15 and the partition plate 16. Therefore, the uppermost recording paper sheet 7 is always kept at the same level so that the distance between the recording paper 7 and the recording head 6 is kept constant. Position sensors K1, K2 and K3 of the recording head 6 of the input/output unit 1 comprise optical switches or microswitches.

FIG. 2 is a detailed perspective view of the input/output unit 1 and the right exhaust roller 8 of the image recording device shown in FIG. 1. The same reference numerals as in FIG. 1 denote the same parts in FIG. 2. Three engaging portions 32 disposed in the input/output unit 1 are axially slidable on slide shafts 31. Therefore, the input/output unit 1 can be reciprocally moved and maintained horizontally.

A motor M1 as a drive source for reciprocally moving the input/output unit 1 is a stepping motor which is driven in the forward and reverse directions in this embodiment. A pulley 33 is mounted on the rotating shaft of the motor M1. The rotational torque is transferred to a drive belt 34 through the pulley 33. The engaging portions 32 of the input/output unit 1 are fixed on the drive belt 34. Therefore, the input/output unit 1 is reciprocally moved by the driving force of the motor M1.

The right exhaust roller 8 is disposed on a roller shaft 35 which is rotatably supported by arms 39 and 39'. The arms 39 and 39' rotate about shafts 37 and 37', respectively. A return spring SP normally urges the arm 39 in the direction indicated by arrow L. A solenoid SL-R is energized to cause the arm 39 to rotate in a direction opposite to the direction indicated by arrow L. Upon operation of the solenoid SL-R, the right exhaust roller 8 is moved to a position to come in contact with the recording paper sheet 7 and to exhaust it. However, when the right exhaust roller 8 does not exhaust the recording paper sheet 7, the right exhaust roller 8 is separated from the recording paper sheet 7 by the urging force of the return spring SP.

A motor M2-R is a drive source for driving the right exhaust roller 8. The driving force of the motor M2-R is transmitted to a pulley 38 fixed at one end of the roller shaft through a belt 36, a clutch CL-R and a belt 36'.

When the clutch CL-R is energized, it transmits the driving force from the belt 36 to the belt 36'. However, if the clutch CL-R is not energized, the driving force is not transmitted to the belt 36'. Therefore, only when power is supplied to the clutch CL-R, is the pulley 38 rotated and the right exhaust roller 8 rotated in the direction indicated by arrow M to exhaust the recording paper sheet 7 to the right exhaust tray 9. The peripheral speed of the exhaust roller 8 is set to twice the moving speed of the input/output unit 1.

The left exhaust roller 10 has the same construction as the right exhaust roller 8 described above, and a detailed description thereof will be omitted.

The recording paper sheet may be drawn by the suction force, or a pickup mechanism such as a pawl may be utilized in place of the exhaust roller.

Figure 3:
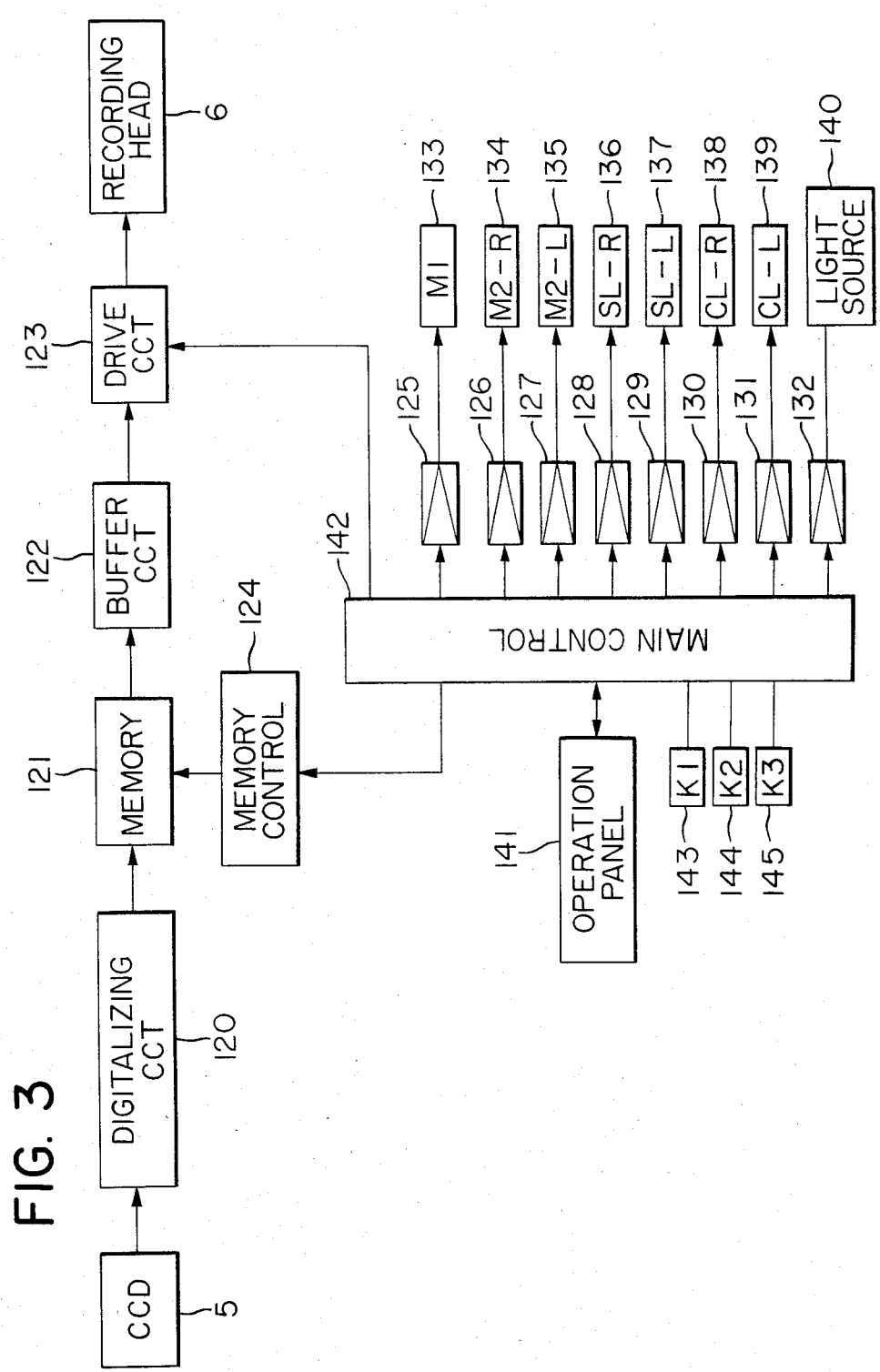
FIG. 3 is a block diagram of an example of a control circuit of the device shown in FIG. 1.

FIG. 3 shows an example of a control unit of the device shown in FIGS. 1 and 2. The same reference numerals as in FIGS. 1 and 2 denote the same parts in FIG. 3 for convenience.

A digitalizing circuit 120 digitalizes image data read by the line image sensor 5. A memory 121 which may comprise a RAM (random access memory) stores image data digitalized by the digitalizing circuit 120. The capacity of the memory 121 may be arbitrarily determined, varying from a small capacity of a line memory to a large capacity of a page memory. The image data of the original may be recorded while being read out. Alternatively, the image data of one or several originals may be temporarily stored in the memory and read out again from the memory for recording.

A buffer circuit 122 supplies the image data read out from the memory 121 to a drive circuit 123. The drive circuit 123 causes the recording head 6 to record an image on the recording paper sheet on the basis of the image data supplied from the buffer circuit 122.

A main control 142 comprises a known one-chip microcomputer. A memory control 124 is controlled by the main control 142 and generates an address signal, a timing signal and a read/write signal to the memory 121. Drivers 125 to 132 transmit output signals from the main control 142 to corresponding control units. A motor (M1) 133 is a drive source for reciprocally moving the input/output unit 1 as shown in FIG. 2. Motors (M2-R) 134 and (M2-L) 135 drive the right and left exhaust rollers 8 and 10, respectively. Solenoids (SL-R) 136 and (SL-L) 137 drive the arms which support the right and left exhaust rollers 8 and 10, respectively. Clutches (CL-R) 138 and (CL-L) 139 control the transmission of the rotational force of the motors 134 and 135, respectively. The light source 2 corresponds to a light source 140 which is driven by the driver 132. A control panel 141 includes the print switch, the numeric keys for setting the recording paper sheet number and the like.

The position sensors K1, K2 and K3 for detecting the position of the input/output unit 1 shown in FIG. 1 correspond to position sensors 143 to 145 shown in FIG. 3.

The main control 142 controls the drivers 125 to 132 and the memory control 124 based on the control program prestored in the main control 142 in accordance with an instruction from the operation panel 141 and outputs from the position sensors K1, K2 and K3.

Figures 4, 4A, 4B:
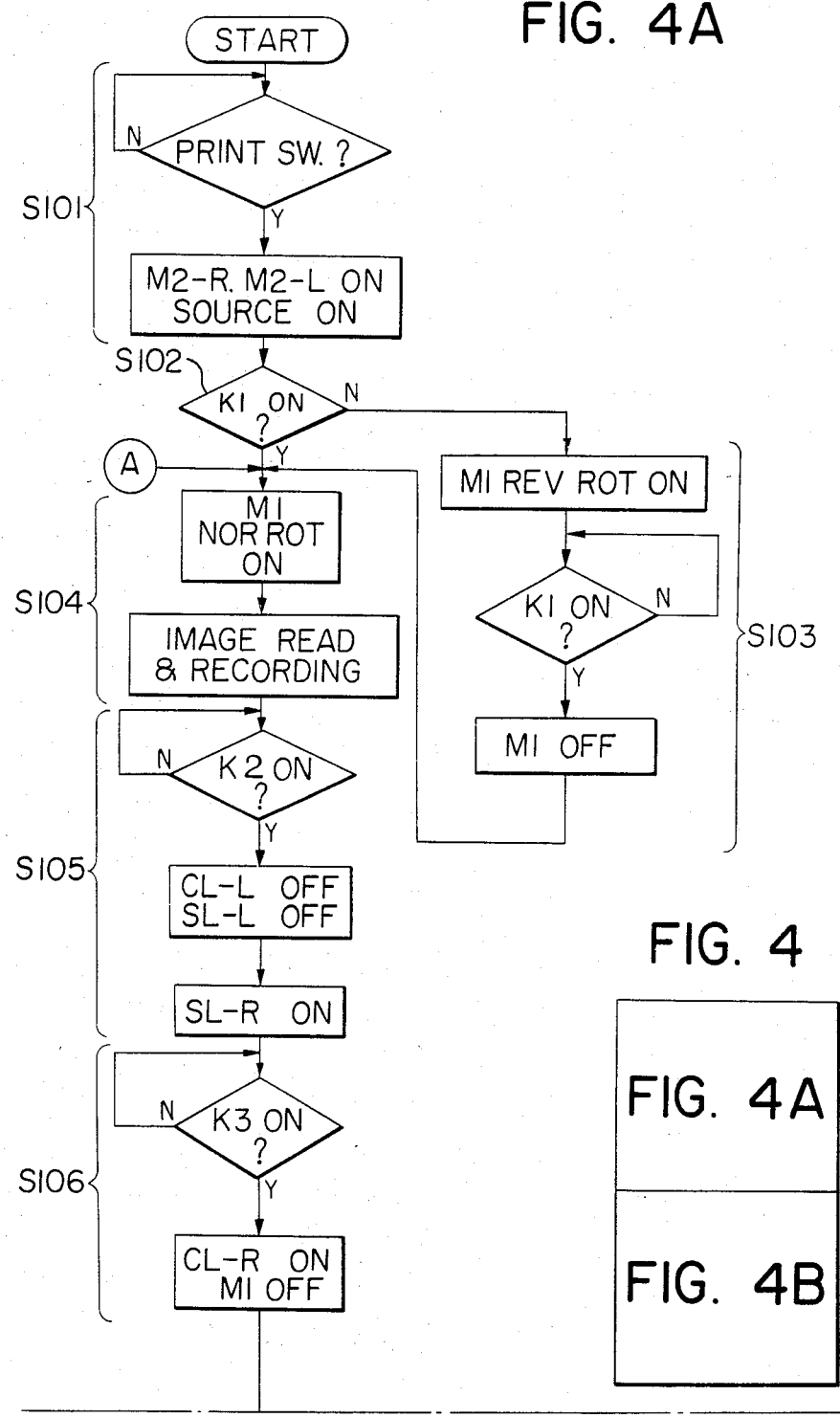
FIGS. 4A and 4B are flow charts of a control program of the control unit shown in FIG. 4.
Figure 4B:
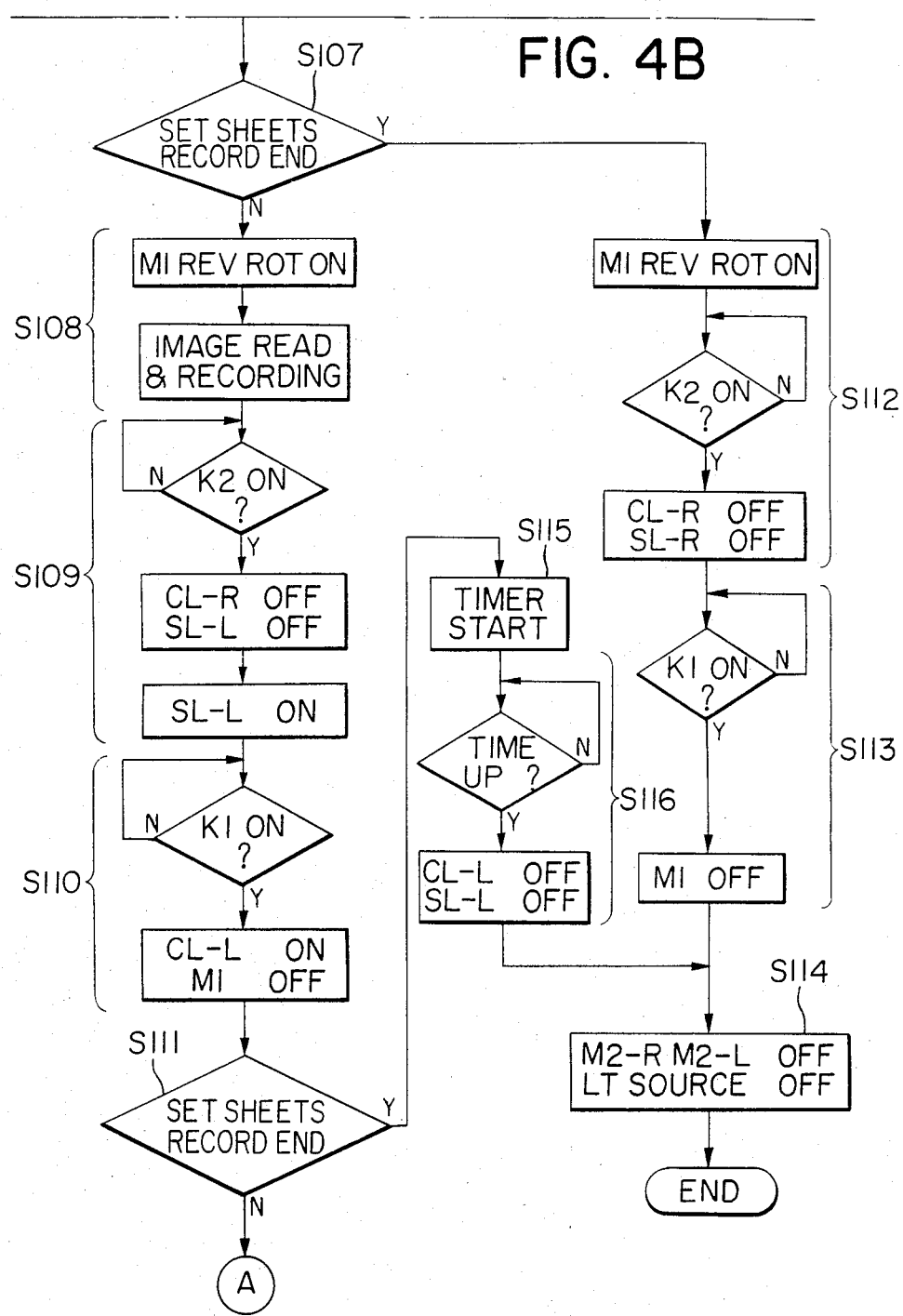

FIG. 4 is a flow chart of a control program stored in the ROM of the main control 142 for controlling the recording operation of the device shown in FIG. 1.

In step S101, when the print switch is depressed, the motors M2-R and M2-L are turned on to drive the right and left exhaust rollers 8 and 10. Further, the light source 2 for exposing the original to light is turned on.

In step S102, the position sensor K1 discriminates whether or not the input/output unit 1 is positioned in the initial position indicated by the solid line in FIG. 1. If the position sensor K1 is ON, the input/output unit 1 is discriminated to be in the initial position. The program then advances to step S104. However, if the position sensor K1 is OFF, the program advances to step S103. The motor M1 is driven in the reverse direction to move the input/output unit 1 in the direction indicated by arrow β. When the input/output unit 1 returns to the initial position and the position sensor K1 is turned on, the motor M1 is turned off and the program advances to step S104.

In step S104, the motor M1 is driven in the forward direction to cause the input/output unit 1 to move in the direction indicated by arrow α, the image on the original 13 on the original table 12 is read out by the line image sensor 5 and the image data is recorded on the recording paper sheet 7 by the recording head 6.

In step 105, the input/output unit 1 during movement discriminates whether or not the position sensor K2 is turned on. If the position sensor K2 is turned on, the clutch CL-L and the solenoid SL-L are turned off to position the left exhaust roller 10 in the position indicated by the broken line in FIG. 1. The solenoid SL-R is then turned on to move the right exhaust roller 8 to the position indicated by the broken line in FIG. 1.

In step S106, when the input/output unit 1 reaches the position indicated by the broken line in FIG. 1 and the position sensor K3 is turned on, the clutch CL-R is turned on to transmit the driving force of the motor M2-R to the right exhaust roller 8 so that the recording paper sheet 7 on which an image is recorded is exhausted. Simultaneously, the motor M1 is turned off to interrupt movement of the input/output unit 1.

In step S107, the main control 142 discriminates whether or not "set sheets record end" is detected. If all the recording paper sheets 7 which correspond to the preset (set) sheet number are not completely recorded, the program advances to step S108 to drive the motor M1 in the reverse direction. The input/output unit 1 is moved in the direction indicated by the arrow β, simultaneously reading the image on the original and recording the image on the recording paper sheet 7.

In step S109, if the input/output unit 1, which is returning to the initial position, causes the position sensor K2 to turn on, the recording paper sheet on which an image is recorded is completely discharged onto the right exhaust tray 9. Therefore, the clutch CL-R is turned off to interrupt rotation of the right exhaust roller 8 which is then moved to the position indicated by the solid line in FIG. 1. Further, the solenoid SL-L is turned on to move the left exhaust roller 10 to the position indicated by the solid line in FIG. 1.

In step S110, if the position sensor K1 detects that the input/output unit 1 which is moving in the direction indicated by arrow α has reached the position indicated by the solid line in FIG. 1, the clutch CL-L is then turned on. The driving force of the motor M2-L is transmitted to the left exhaust roller 10. Therefore, the recording paper sheet on which an image is recorded is exhausted to the left exhaust tray 11. Further, the motor M1 is turned off to interrupt the movement of the input/output unit 1.

In step S111, it is discriminated whether or not recording of all the recording paper sheets corresponding to the set is completed number in the same manner as in step S107. If recording is not completed, the program returns to step S104. The input/output unit 1 is moved in the direction indicated by arrow α. Image reading and recording are then performed.

In step S107, however, if recording is completed, the program advances to step S112, in which the motor M1 is driven in the reverse direction and the input/output unit 1 is moved from the position indicated by the broken line in FIG. 1 to the position indicated by the solid line in FIG. 1. Meanwhile, if the position sensor K2 is turned on, the recording paper sheet is completely exhausted to the right exhaust tray 9. The right exhaust roller 8 is turned off, and the clutch CL-R and the solenoid SL-R are turned off to move the right exhaust roller 8 to the position indicated by the solid line in FIG. 1.

In step S113, if the position sensor K1 is turned on, the motor M1 is then turned off. The input/output unit 1 thus stops moving. The program then advances to step S114.

In step S111, if all the recording paper sheets which correspond to the preset sheet number are printed, the program advances to step S115 and a built-in timer is operated. The timer is preset for delivering to the left exhaust tray 11 the recording paper sheet on which an image recorded.

In step S116, when the time set by the timer elapses, the left exhaust roller 11 stops rotating. The clutch CL-L and the solenoid SL-L are turned off to move the left exhaust roller 11 to the position indicated by the broken line in FIG. 1. The program then advances to step S114.

In step S114, the motors M2-R and M2-L for respectively driving the right and left exhaust rollers 8 and 10 are turned off and the light source is cut off. Thus, the recording operation is completed.

Figure 5:
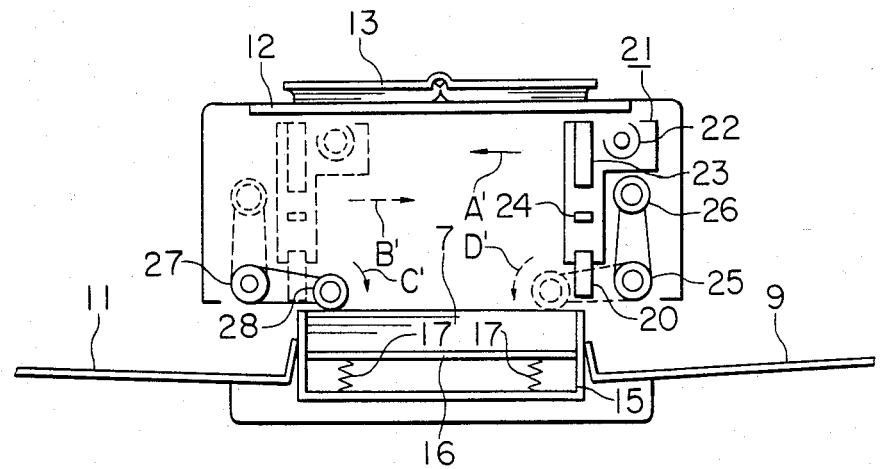
FIG. 5 is a sectional view of an image recording device according to a second embodiment of the present invention.

FIG. 5 shows an image recording device according to a second embodiment of the present invention. The reference numerals as in FIG. 1 denote the same parts and functions as in FIG. 5. In the second embodiment, an input/output unit 21 comprises a lamp 22 for exposing an original, a SELFOC lens array 23, an image sensor 24 such as a CCD, and a recording head 20 consisting of a full-line inkjet mechanism.

When a print button (not shown) is depressed, the lamp 22 is turned on and the input/output unit 21 is moved at a predetermined speed in the direction indicated by arrow A'. The input/output unit 21 reads an image of the original 13 in units of lines in the same manner as in the embodiment shown in FIG. 1. Simultaneously each line of the image is sequentially recorded on the recording paper sheet 7 by the recording head 20. While the input/output unit 21 is moved from the position indicated by the solid line to a position 21' indicated by the broken line, exhaust rollers 26 and 28 are rotated about reference rollers 25 and 27 toward the positions respectively indicated by the broken lines. In this manner, reading and recording during one-way movement of the input/output unit 21 are completed. When the input/output unit 21 reaches the position indicated by the broken line, the exhaust roller 26 is rotated in the direction indicated by arrow D' to exhaust the recording paper sheet 7 to the right exhaust tray 9. The input/output unit 21 then returns in the direction indicated by arrow B'. In this case, if recording of a plurality of recording paper sheets is required, the input/output unit 21 executes reading and recording during the return movement. The exhaust rollers 26 and 28 are moved to the positions indicated by the solid lines, respectively. When recording is completed, the exhaust roller 28 is rotated in the direction indicated by arrow C'. Thus, the recording paper sheet 7 is exhausted to the left exhaust tray 11.

As described above, the image recording device according to the present invention performs recording, while the recording paper sheets are stored in a housing such as a cassette or a deck. A transfer unit for the recording medium becomes very simple in construction, preventing jamming and ramp completely. Further, the recording paper sheets remain in the cassette during recording, so that image registration error with changes in convey pitch is prevented. Therefore, an image of high quality is reproduced. Further, since the device itself is simple in construction, a compact device can be manufactured.

In the above embodiment, the inkjet recording head is used as the recording means. However, the present invention may be applied to thermal recording, electrostatic recording and the like.

Further, an exhaust roller may be arranged downstream of the exhaust roller 8 or 10 to perform a smoother exhaust operation.

Figure 6:
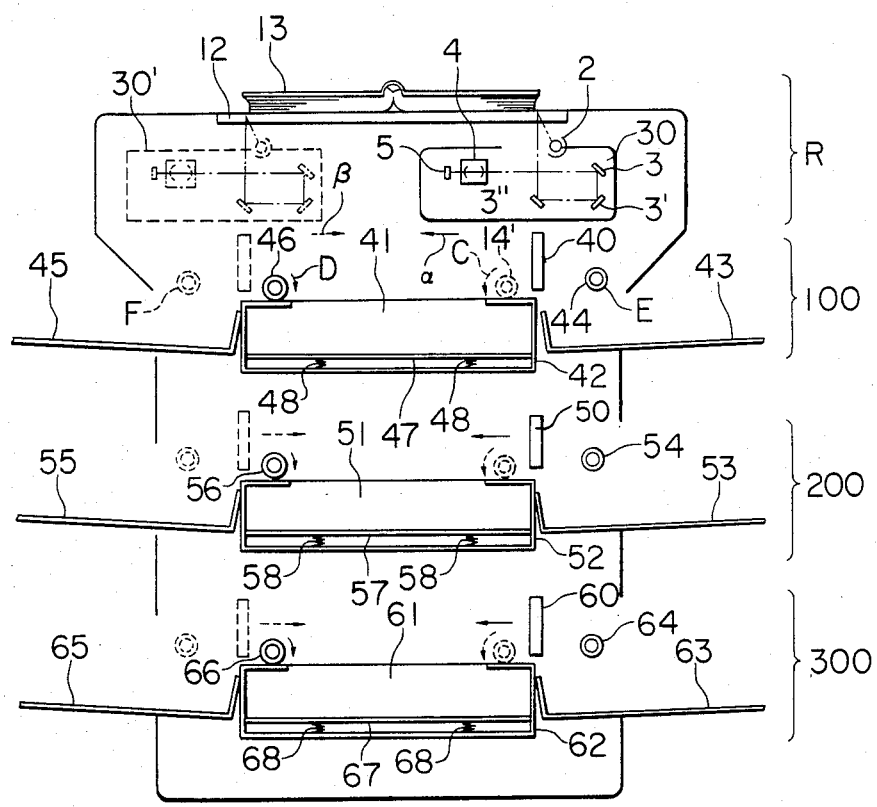
FIG. 6 is a sectional view of an image recording device according to a third embodiment of the present invention.

FIG. 6 shows an image recording device according to still another embodiment of the present invention. In the image recording devices shown in FIGS. 1 and 5, the same recording operation must be repeated when the same image of the original or same data is to be recorded on a plurality of recording paper sheets. Thus, the total recording is the product of the time for each recording operation by the set sheet number.

The image recording device according to the third embodiment has at least two housing means for housing a plurality of recording paper sheets, at least two recording means for recording images on the recording paper sheets in at least two housing means, and at least two exhausting means for exhausting recording paper sheets on which images are recorded from the housing means. Therefore, this image recording device can perform recording with a plurality of recording paper sheets at high speed.

The same reference numerals as in FIG. 1 denote the same parts in FIG. 6. An original reading section R has the original table 12 on which the original 13 is placed, and an original reading unit 30 which includes the lamp for exposing the original, the mirrors 3", 3' and 3, the focusing lens 4 and the line image sensor 5 such as a CCD. The original reading unit 30 is moved reciprocally at a predetermined speed between a position indicated by the solid line in FIG. 6 and a position indicated by the broken line in FIG. 6 to read the image of the original 13. The image recording device further includes a first recording section 100, a second recording section 200 and a third recording section 300. The first to third recording sections have recording heads 40, 50 and 60 comprising inkjet heads, respectively, and cassettes 42, 52 and 62 for the recording paper sheets 41, 51 and 61, respectively. The recording heads 40, 50 and 60 comprise, more particularly, full-line inkjet heads which are vertically linearly aligned in FIG. 6. The recording heads 40, 50 and 60 are moved from positions indicated by the solid lines to positions indicated by the broken lines, respectively, in response to an electrical signal from the original reading unit 30. With these recording heads, images are recorded on the recording paper sheets 41, 51 and 61 within the cassettes 42, 52 and 62, respectively. Right exhaust rollers 44, 54 and 64 deliver the recording paper sheets 41, 51 and 61 on which images are respectively recorded to right exhaust trays 43, 53 and 63, respectively. Similarly, left exhaust rollers 46, 56 and 66 deliver the recording paper sheets 41, 51 and 61 to left exhaust trays 45, 55 and 65, respectively. The cassettes 42, 52 and 62 have partition plates 47, 57 and 67, and elastic members 48, 58 and 68, respectively. The uppermost recording paper sheet of each of the recording paper sheets 41, 51 and 61 is maintained at a constant level with respect to each of the recording heads 40, 50 and 60. The first to third recording sections 100, 200 and 300 are arranged in units and vertically supported by supports (not shown) in a three-stepped manner. However, the recording sections may be arranged in a two-stepped or a four-stepped manner. Further, the reading section R may be arranged independently of the recording sections. The details of the driving unit and exhaust units of the device in FIG. 6 are substantially the same as those in FIG. 1, except that the reading section is not integrally arranged with the recording heads.

The mode of operation of the device in FIG. 6 will be described. The recording sections 100, 200 and 300 are completely identical, and a description of the first recording section 100 will be made and a description of the recording sections 200 and 300 will be omitted.

The original 13 is placed on the original table 12, and a recording section selection key (not shown) is depressed to select the first recording section 100. The print switch is then depressed and light is radiated from the light source 2. Simultaneously, the original reading unit 30 is moved in the direction indicated by arrow α. The light radiated from the light source 2 becomes incident on the original 13 placed on the original table 12. The light reflected by the original 13 is focused on the image sensor 5 through an optical path defined by the mirrors 3", 3' and 3 and the lens 4, as indicated by the alternate long and one short dashed line. Image data is thus supplied to the image sensor 5. The output from the image sensor 5 is electrically processed by A/D conversion or the like and supplied as an image recording signal corresponding to input data to the recording head 40. In synchronism with the reading operation of the image data from the original by the original reading unit 30, the recording head 40 is moved at the same speed as the original reading unit 30 in the direction indicated by arrow α. Therefore, the image is recorded on the recording paper sheet 41 in response to the image recording signal.

The original reading unit 30 and the recording head 40 respectively perform reading of the image of the original 13 and recording of the image on the recording paper sheet 41. When the original reading unit 30 and the recording head 40 reach the position indicated by the broken line, recording is completed. The right exhaust roller 44 is moved to a position 44' indicated by the broken line. When the right exhaust roller 44 is rotated in the direction indicated by arrow C, the recording paper sheet 41 on which the image is recorded is delivered onto the right exhaust tray 43. The peripheral speed of the right exhaust roller 44 is faster than the moving speed of the original reading unit 30 and the recording head 40, so that reading and recording are continuously performed by moving the original reading unit 30 and the recording head 40 in the direction indicated by arrow $\beta$. Especially, in continuous recording, no waiting time is required. In the same manner as the movement in the direction indicated by arrow $\alpha$, the original reading unit 30 and the recording head 40 are moved in the direction indicated by arrow $\beta$. Reading and recording are performed during this movement. The recording paper sheet 41 on which the image is recorded is delivered onto the left exhaust tray 45 by rotating the left exhaust roller 46 in the direction indicated by arrow D. The right and left exhaust rollers 44 and 46 are respectively moved to points E and F before the original reading unit 30 and the recording head 40 come close to the exhaust rollers. Thus, the right and left exhaust rollers 44 and 46 do not interfere with the movement of the recording head 40.

In order to record the same image on three different recording paper sheets, the recording section selection key is depressed to select all the recording sections 100, 200 and 300. When the original reading unit 30 reads image data from the original, the same image can be spontaneously recorded on the recording paper sheets 41, 51 and 61 with the recording heads 40, 50 and 60, respectively. Thus, total recording time is shortened to $\frac{1}{3}$.

Figure 7:
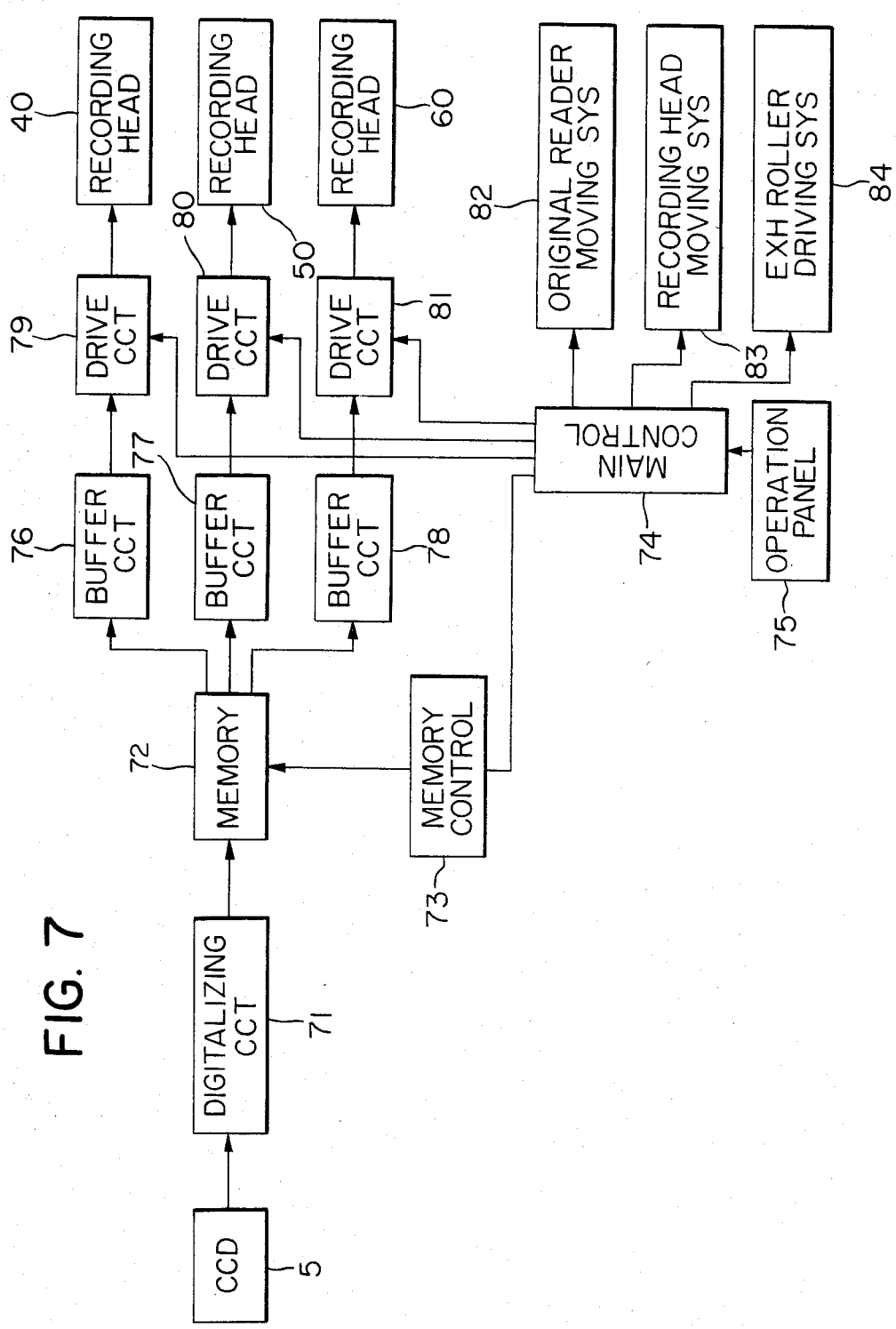
FIG. 7 is a block diagram of an example of a control circuit of the device shown in FIG. 6.

FIG. 7 shows one example of a control unit applied to the third embodiment. The same reference numerals as in FIG. 6 denote the same parts in FIG. 7.

Referring to FIG. 7, image data read out from the line image sensor 5 such as a CCD is supplied to a digitalizing circuit 71 (to be referred to as a binary encoder circuit 71 hereinafter). A memory 72 stores image data generated by the binary encoder circuit 71. The memory 72 may comprise a RAM. The capacity of the memory 72 may be arbitrarily determined, varying from a small line memory which corresponds to the capacity for storing data of one line read by the line image sensor 5 to a large page memory which corresponds to image data of a few pages. Therefore, if a large memory is used, image data corresponding to one page or a few pages is first stored in the memory 72 and desired pieces of data are then read out and recorded on the recording paper sheets, in addition to simultaneous readout and recording of image data. A memory control 73 is controlled by a main control 74 and supplies an address signal, a timing signal, a read/write signal and so on. The main control 74 executes various control operations on the basis of the key-in operation at an operation panel 75. Buffer circuits 76, 77 and 78 receive data from the memory 72 and supply it to drive circuits 79, 80 and 81. The drive circuits 79 to 81 are turned on/off by the main control 74 to drive the recording heads 40, 50 and 60. An original reader moving system 82 drives the original reading unit 30. A recording head moving system 83 drives the recording heads 40, 50 and 60. An exhaust roller driving system 84 drives the right rollers 44, 54 and 64 and the left rollers 46, 56 and 66. These systems are driven under the control of the main control 74.

The original reader moving system 82, the recording head moving system 83 and the exhaust roller driving system 84 include the clutches, solenoids, and motors which are shown in FIG. 2. Since their operations are the same, a detailed description thereof will be omitted.

In the above embodiment, the recording sections 100, 200 and 300 are vertically supported by the supports (not shown) in a three-stepped manner. However, each recording section may be aligned horizontally as shown in FIG. 8.

Since a plurality of recording sections are arranged, images may be recorded on the recording medium stored in the cassettes. The transfer unit for the recording media can be simplified, preventing jamming and irregular convey completely. Images of high quality are reproduced at high speed.

In the embodiments in FIGS. 6 and 8, the inkjet recording heads are used as the recording means. However, the present invention can be applied to other thermal and electrostatic recording systems.

FIG. 9 shows an image recording device according to still another embodiment of the present invention. In this fifth embodiment, the image recording device records an image on a recording paper sheet in an equal size or with a change in magnification in order to satisfy the user's needs.

Figure 9A:
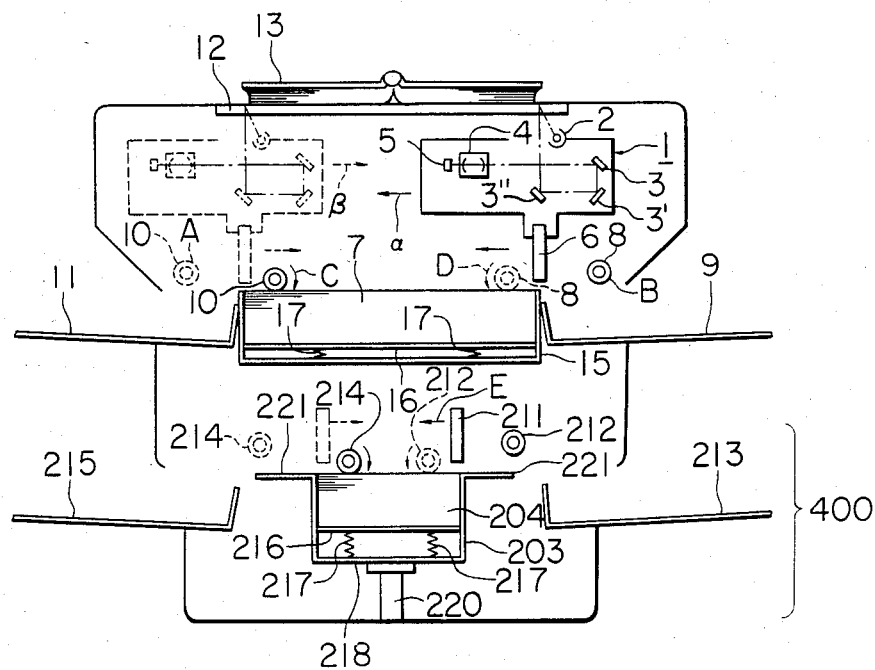
FIG. 9A is a sectional view of an image recording device according to a fifth embodiment of the present invention.
Figure 9B:
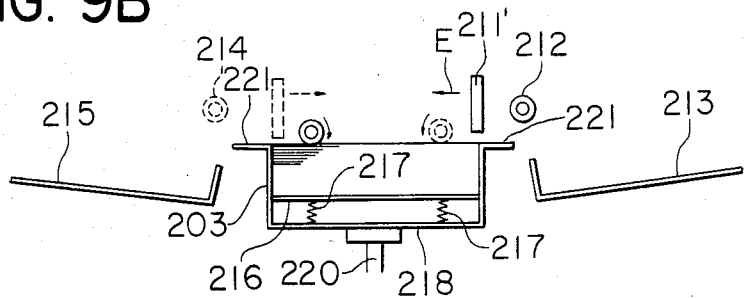
FIG. 9B is a sectional view of the main parts of the device shown in FIG. 9A when recording with a change in magnification is performed.
Figure 9C:
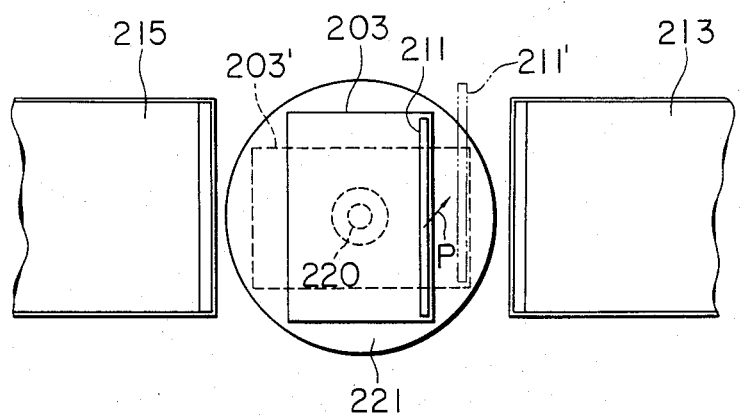
FIG. 9C is a plan view of the main part of the device shown in FIG. 9A in order to explain recording at full size and with a change in magnification.

The same reference numerals as in FIG. 1 denote the same parts in FIGS. 9A to 9C. The image recording device in FIG. 9A is substantially the same as that in FIG. 1, except that the device in FIG. 9A has a recording section 400 for recording an image with a change in magnification.

Referring to FIG. 9A, the input/output unit 1 reads image data from the original 13 placed on the original table 12. The readout image data is recorded on the recording paper sheet 7 housed in the cassette 15. The input/output unit 1 has the light source 2 for exposing the original to light, the mirrors 3, 3' and 3", the focusing lens 4, the line image sensor 5 such as a CCD, and the first recording head 6 of the full-line inkjet type. The right exhaust roller 8 delivers the recording paper sheet 7 on which an image is recorded and which is housed in the cassette 15 onto the right exhaust tray 9. The left exhaust roller 10 delivers the recording paper sheet 7 onto the left exhaust tray 11. The cassette 15 houses recording paper sheets of A3 size in this embodiment and has the partition plate 16 and elastic members 17 disposed between the partition plate 16 and the bottom of the cassette 15. The uppermost recording paper sheet 7 is kept at a constant level with reference to the recording head 6.

In the recording section 400, a cassette 203 houses recording paper sheets 204 of A4 size. A recording head 211 of the full-line inkjet type is driven in response to an image signal from the line image sensor 5 of the input/output unit 1. With the second recording head 211, an image is recorded on the recording paper sheet. A right exhaust roller 212 delivers the recording paper sheet 204 onto a right exhaust tray 213. A left exhaust roller 215 delivers the recording paper sheet 204 onto a left exhaust tray 215.

A rotating shaft 220 is disposed at a bottom plate 218 of the cassette 203 and driven by a motor (not shown). As shown in FIG. 9C, the cassette 203 is located in a position indicated by the solid line when recording at full size is performed. However, when recording is to be performed with a change in magnification, the cassette 203 is rotated by the rotating shaft 220 to a position 203' indicated by the broken like. The position 203' corresponds to a position of the cassette 203 shown in FIG. 9B. Further, as shown in FIG. 9C, the recording head 211 is moved in the direction indicated by arrow P and is brought to a position 211' indicated by the alternate-long-and-two-dashed line. A circular guide 221 is disposed around the cassette 203, as shown in FIG. 9C. The guide 221 serves to smoothly deliver the recording paper sheet 204 from the exhaust roller 212 or 214 to the exhaust tray 213 or 215. The cassette 203 has a partition plate 216 and elastic members 217. The operation of the driving units for driving the reading unit, the recording heads and the exhaust rollers is the same as that in FIG. 2, and a detailed description thereof will be omitted.

Figure 10:
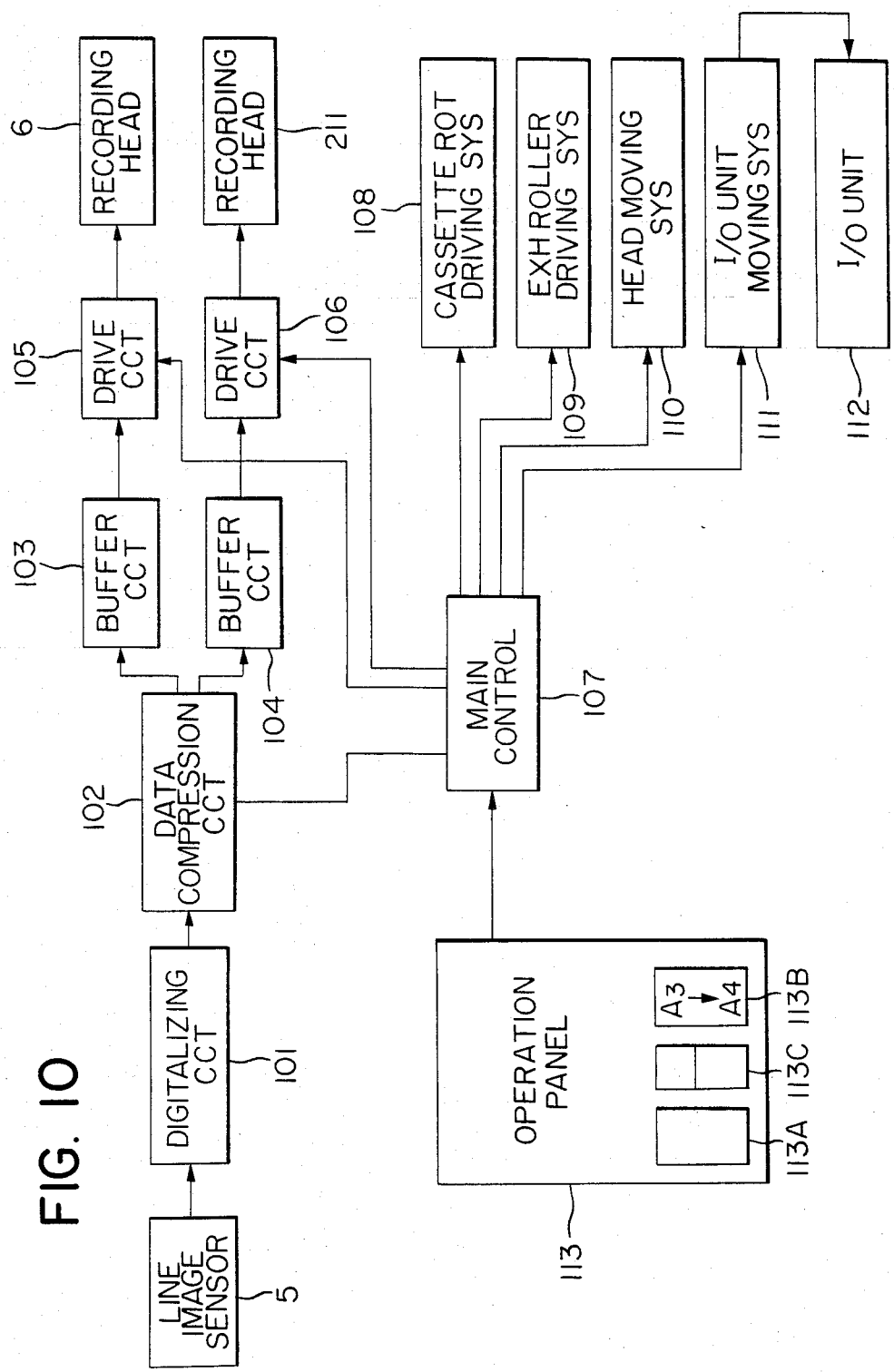
FIG. 10 is a block diagram of an example of a control circuit of the device shown in FIG. 9.

FIG. 10 is a block diagram of an example of a control unit of the device shown in FIG. 9. The same reference numerals as in FIG. 9 denote the same parts in FIG. 10. Image data read out by the line image sensor 5 is digitalized in a digitalizing sensor 101. A data compression circuit 102 compresses data in the direction of main scanning. In this embodiment, image data along the short side of the A3 size sheet is sampled by predetermined sampling and compressed to data of a length corresponding to the short side of the A4 size sheet. Image data supplied from the digitalizing circuit 101 is thus compressed by the data compression circuit 102 and supplied to drive circuits 105 and 106 through buffer circuits 103 and 104, respectively. The drive circuits 105 and 106 drive the recording heads 6 and 211 on the basis of the image data. A main control 107 controls the drive circuits 105 and 106 to turn them on/off.

An operation panel 113 has a print switch 113A, a magnification changeover key 113B for specifying recording of an image of A3 size on a recording paper sheet of A4 size, a selection key 113C for selecting the size of the copying paper sheet and the recording heads 6 and 211, and numerical keys for entering a preset recording sheet number.

When an instruction for initializing the device is entered from the operation panel to the main control 107, the main control 107 controls to drive an input/output unit moving system 111 or the input/output unit moving system 111 and a head moving system 110. The input/output unit 1 is then moved to read image data and record the readout data on the recording paper sheet. Alternatively, the input/output unit 1 and the recording head 211 are simultaneously moved in the manner to be described for readout and recording of the image data. An exhaust roller driving system 109 controls to drive the exhaust rollers 8, 10, 212 and 214. A cassette rotary driving system 108 rotates the cassette 203 indicated by the solid line in FIG. 9C to the position indicated by the broken line, by driving the motor to rotate the rotating shaft 220, in accordance with a specified magnification. The head moving system 110 functions to move the head 211 in correspondence with rotation of the cassette 203 when recording with a change in magnification from A3 to A4 is performed.

Figure 11A:
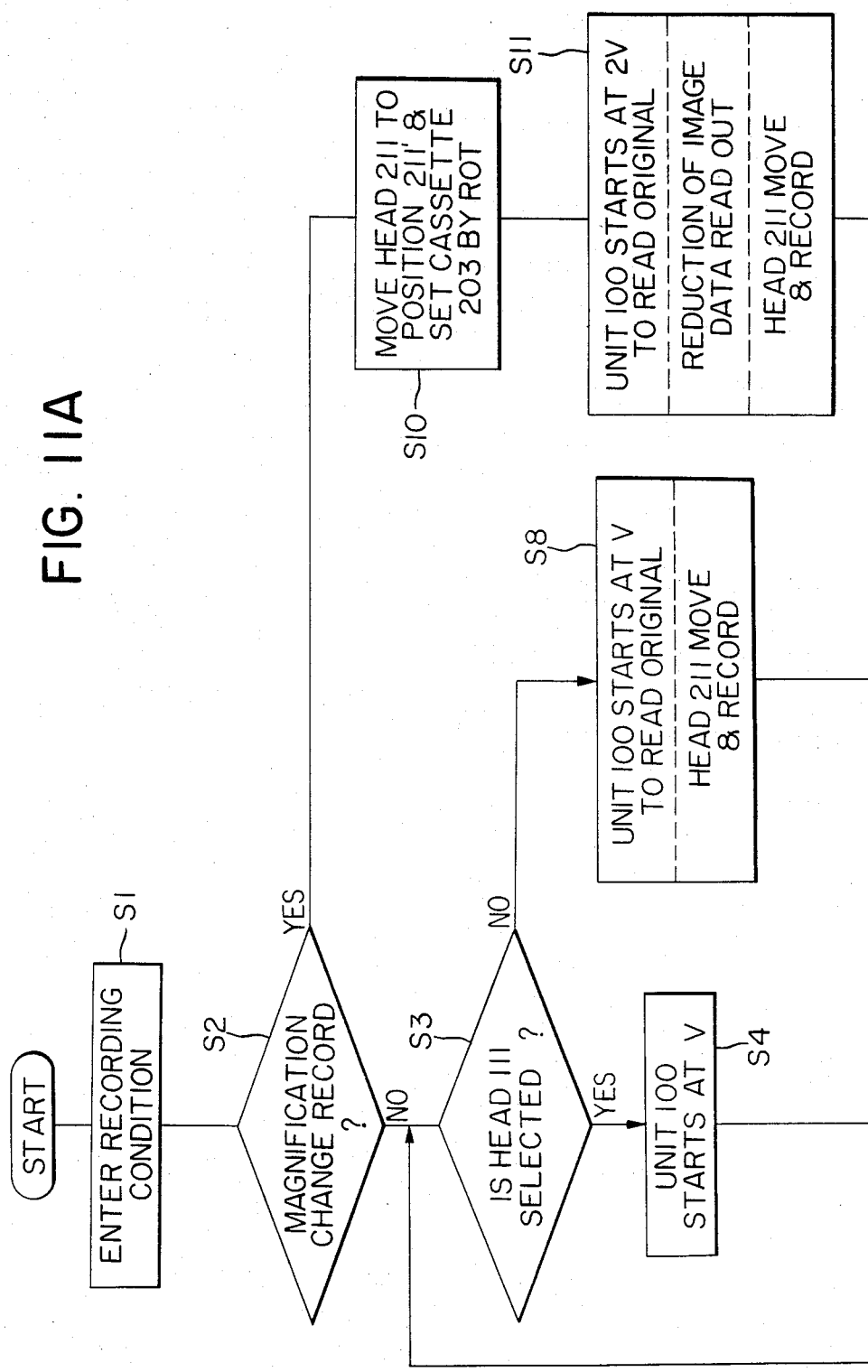

The mode of operation of the image recording device with the above arrangement with be described with reference to a flow chart shown in FIG. 11. In recording in an equal size, using an original of A3 size, the original of A3 size is placed on the original table 12. With the selection key 113C on the operation panel 113, the recording head 6 is selected. Thereafter, when the print switch 113A is depressed, that is, steps S1, S2 and S3 are all checked, light is emitted from the light source 2 and the input/output unit 1 starts moving at a constant speed V in the direction indicated by arrow α in step S4.

The light from the light source 2 is radiated on the original 13 placed on the original table 12. The light reflected by the original 113 is focused by the image sensor 5 through an optical path defined by the mirrors 3", 3' and 3, and the lens 4. When image data of the original 13 is supplied from the image sensor 5 to the digitalizing circuit 101, the digitalizing circuit 101 generates a binary coded signal or a base-n coded signal (n=3, 4, . . . ) to the data compression circuit 102. An instruction for magnification change is not executed by the magnification changeover key 113B of the operation panel 113. The coded image data supplied to the data compression circuit 102 is supplied to the drive circuits 105 and 106 through the buffer circuits 103 and 104. Further, since the drive circuit 105 is controlled by the main control 107 and kept ON, a recording signal corresponding to the image data supplied through the buffer circuit 103 is supplied from the drive circuit 105 to the recording head 6. With the recording head 6, image data based on the recording signal is recorded on the recording paper sheet 7 within the cassette 15 in step S5.

While data input and output are simultaneously performed as described above, the input/output unit 1 is moved to the position indicated by the broken line in FIG. 9A and the recording operation is completed. At this time, the right exhaust roller 8 is located in the position indicated by the broken line. If the exhaust roller 8 is rotated in the direction indicated by arrow D, the recording paper sheet on which the image is recorded is delivered onto the right exhaust tray 9 in step S6. The peripheral speed of the right exhaust roller 8 is faster than the scanning speed of the input/output unit 1, so the input/output unit 1 can be immediately moved in the direction indicated by broken arrow β. Thus, waiting time in continuous recording is eliminated. When the input/output unit 1 is moved in the direction indicated by arrow β, the recording paper sheet 7 on which the image is recorded is delivered onto the left exhaust tray 11 by the left exhaust roller 10 which is rotated in the direction indicated by arrow C. In step S7, if all the recording paper sheets which correspond to the preset sheet number are recorded, a series of operations is completed.

The right and left exhaust rollers 8 and 10 are respectively moved to the positions A and B before the input/output unit 1 comes closer to these exhaust rollers.

In order to record an original of A4 size on a recording paper sheet of A4 size by selecting the recording head 211, as in steps S8 and S9, the recording head 211 is moved synchronously with the input/output unit 1 in the direction indicated by arrow E in FIG. 9A. An image of the original of A4 size is recorded on the recording paper sheet 204 of A4 size which is housed in the cassette 203.

The mode of operation will be described when the scale of an image of A3 size is reduced to half and recorded on a recording paper sheet of A4 size. The original 13 of A3 size is placed on the original table 12 and the selection key 113C is depressed to select the recording head 211. Simultaneously, the magnification changeover key 113B is depressed (steps S1 and S2). When the main control 107 detects a key-in signal entered by the magnification change-over key 113B, the cassette rotary driving system 108 and the head moving system 110 are driven, so that the cassette 203 is rotated from the position indicated by the solid line to the position 203' indicated by the broken line, as shown in FIG. 9C. Simultaneously, the recording head 211 is moved to the position 211' indicated by the alternate-long-and-two-short dashed line (step S10). When the print switch 113A is depressed, light is radiated from the light source 2. Further, the input/output unit 1 is started to move in the direction indicated by arrow α (FIG. 9A). The print switch 113A is inoperative while the cassette is rotated and the head is moved. The main control 107 controls the input/output unit moving system 111 to move the input/output unit 1 at a speed 2 V which is twice the speed for recording in an equal size. The original 13 is then scanned. The number of scanning lines with which the original 13 is scanned by the image sensor 5 is reduced to half the number of scanning lines for recording in an equal size. The image data is compressed in the direction of the main scanning lines to half the length of data in the main scanning line direction of the original of A3 size in the data compression circuit 102. With the recording head 211, an image is recorded on the recording paper sheet 204 housed in the cassette 203 is moved at the same speed as in recording in an equal size in the direction indicated by arrow F (step S11).

As described above, in this embodiment, the image data is electrically compressed in the main scanning direction by the data compression circuit 22. The image data is mechanically compressed in the subscanning direction by doubling the scanning speed. Thus, the original of A3 size is recorded with a change in magnification on the recording paper sheet of A4 size.

In the above embodiment, the short and long sides of the image of A3 size are reduced to half and recorded on the recording paper sheet of A4 size. However, a desired magnification may be arbitrarily determined in accordance with desired compression rate of the data compression circuit 102 and a desired scanning speed of the input/output unit 1. Similarly, enlarged recording may be arbitrarily performed.

In summary, according to the present invention, recording in an equal size and with a change in magnification is performed while the recording paper sheets are housed in the housing, resulting in convenience. Further, the convey unit of the image recording device according to the present invention is very simple, preventing jamming and irregular convey completely. The recording medium is kept stationary in recording, so that image registration error due to changes in convey pitch is eliminated. A compact device is also manufactured.

Further, according to the present invention, the position of the recording medium is changed in recording with a change in magnification, resulting in excellent operability.

In the embodiment shown in FIG. 9, the inkjet head is used as the recording means. However, the present invention may be applied to thermal and electrostatic recording systems.

The recording medium may be a film-shaped material in place of paper.

In the embodiment, the cassette is rotated in recording with a change in magnification. However, the recording head may be rotated in accordance with a predetermined magnification.

What I claim is:

1. An image recording device comprising:
   means for housing a plurality of sheets of recording medium;
   means for recording an image on a sheet of the recording medium while the sheet is housed in said housing means; and
   means for exhausting from said housing means the recording medium which has been subjected to image recording by said recording means;
   wherein said recording means performs recording during reciprocal movement relative to the recording medium.

2. A device according to claim 1, wherein while said exhausting means exhausts from said housing means the sheet of the recording medium already subjected to image recording, said recording means performs image recording on another sheet of the recording medium housed in said housing means.

3. A device according to claim 1, wherein said recording means records an image on the recording medium in an equal size or with a change in magnification.

4. An image recording device comprising:
   means for reading image data of an original;
   at least two means for housing a plurality of sheets of recording medium; and
   at least two means, each disposed in a respective one of said at least two housing means, wherein each said recording means is for recording an image on a sheet of the recording medium while the sheet is housed within the respective said housing means, in accordance with the image data from said reading means.

5. A device according to claim 4, wherein said at least two housing means house recording medium of different sizes.

6. A device according to claim 4, further including means for selecting one of said at least two recording means for recording.

7. A device according to claim 6, wherein said selecting means performs the selecting operation in accordance with a magnification ratio.

8. A device according to claim 4, wherein said at least two recording means simultaneously record the same image data on sheets of the recording medium respectively housed in said at least two housing means.

9. A device according to claim 4, wherein said at least two housing means each have means for delivering the recording medium therefrom, respectively.

10. An image recording device comprising:
    means for housing a plurality of sheets of recording medium;
    means for recording an image on the recording medium housed in said housing means; and
    means for changing a recording direction of the image relative to the recording medium in accordance with a magnification ratio.

11. A device according to claim 10, wherein said changing means rotates said housing means in accordance with the magnification ratio.

12. A device according to claim 10, wherein said recording means records the image on the recording medium while the recording medium is housed within said housing means.

13. A device according to claim 10, further including means for reading image data of an original, wherein said recording means records the image on the recording medium based on the output from said reading means.

14. A device according to claim 10, further comprising means for setting a magnification ratio.

15. An image recording device comprising:
a platen on which an original is placed;
means for housing a recording medium; and
a scanning member including means for reading an image of the original placed on said platen and means for recording an image of the original on the recording medium housed in said housing means in accordance with the image data from said reading means; wherein reading operation of said reading means and recording operation of said recording means are performed in parallel.

16. A device according to claim 15, wherein said reading means comprises a one-dimensional solid state image pickup element, and said recording means comprises a plurality of recording elements which are one-dimensionally aligned.

17. A device according to claim 15, wherein said scanning member further includes means for irradiating the original on said platen.

18. A device according to claim 15, further including means for exhausting from said housing means the recording medium which has been subjected to image recording by said recording means.

19. A device according to claim 15, wherein said scanning member is disposed between said platen and said housing means.

20. A device according to claim 15, wherein said scanning member reciprocates.

* * * * *